United States Patent
Jesionowski et al.

(10) Patent No.: US 8,346,386 B2
(45) Date of Patent: Jan. 1, 2013

(54) BREADTH SPREADING PLACEMENT OF DATA STORAGE CARTRIDGES IN MULTI-CARTRIDGE DEEP SLOT CELLS OF AN AUTOMATED DATA STORAGE LIBRARY

(75) Inventors: Leonard George Jesionowski, Tucson, AZ (US); Shawn Michael Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/452,607

(22) Filed: Apr. 20, 2012

(65) Prior Publication Data
US 2012/0236434 A1 Sep. 20, 2012

Related U.S. Application Data

(63) Continuation of application No. 12/200,659, filed on Aug. 28, 2008.

(51) Int. Cl.
*G11B 5/008* (2006.01)
(52) U.S. Cl. .................... 700/214; 360/92.1; 360/91
(58) Field of Classification Search .................... 700/214
See application file for complete search history.

(56) References Cited

U.S. PATENT DOCUMENTS

| | | | |
|---|---|---|---|
| 4,506,936 A | 3/1985 | Miller | |
| 5,956,301 A | 9/1999 | Dimitri et al. | |
| 6,038,490 A | 3/2000 | Dimitri et al. | |
| 6,510,110 B2 | 1/2003 | Watanabe et al. | |
| 6,675,063 B2 | 1/2004 | Bosley et al. | |
| 6,938,120 B2 | 8/2005 | Gibble et al. | |
| 6,973,369 B2 | 12/2005 | Trimmer et al. | |
| 7,127,575 B2 | 10/2006 | Kano | |
| 7,349,175 B2 * | 3/2008 | McIntosh et al. | 360/91 |
| 7,475,205 B2 * | 1/2009 | McIntosh et al. | 711/161 |
| 7,672,753 B1 * | 3/2010 | Rossi | 700/214 |
| 2003/0083777 A1 * | 5/2003 | Ostwald et al. | 700/218 |
| 2007/0162180 A1 * | 7/2007 | Goodman et al. | 700/225 |

* cited by examiner

*Primary Examiner* — Gene Crawford
*Assistant Examiner* — Kyle Logan
(74) *Attorney, Agent, or Firm* — John H. Holcombe

(57) ABSTRACT

An automated data storage library having a plurality of multi-cartridge deep slot cells, each configured to store a plurality of data storage cartridges arranged in sequential order of tiers from front to rear, and having accessor(s) to selectively extract, place and transport cartridges with respect to the cells; operating the accessor(s) to selectively extract, place and transport cartridges with respect to the multi-cartridge deep slot cells and with respect to other elements of the automated data storage library; filling at least the frontmost tier of vacant at least selected multi-cartridge deep slot cells in the selectively extracting, placing and transporting step in accordance with a predetermined algorithm, while leaving other tiers vacant. If the frontmost tier is full, a cartridge is placed into the one of the selected multi-cartridge deep slot cells having the factored greatest number of tiers available to place a cartridge.

10 Claims, 12 Drawing Sheets

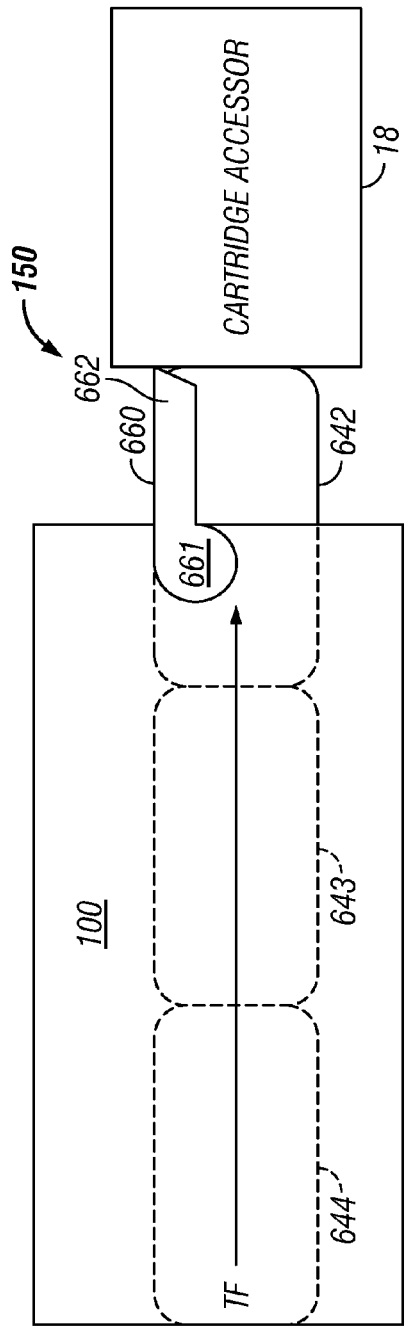
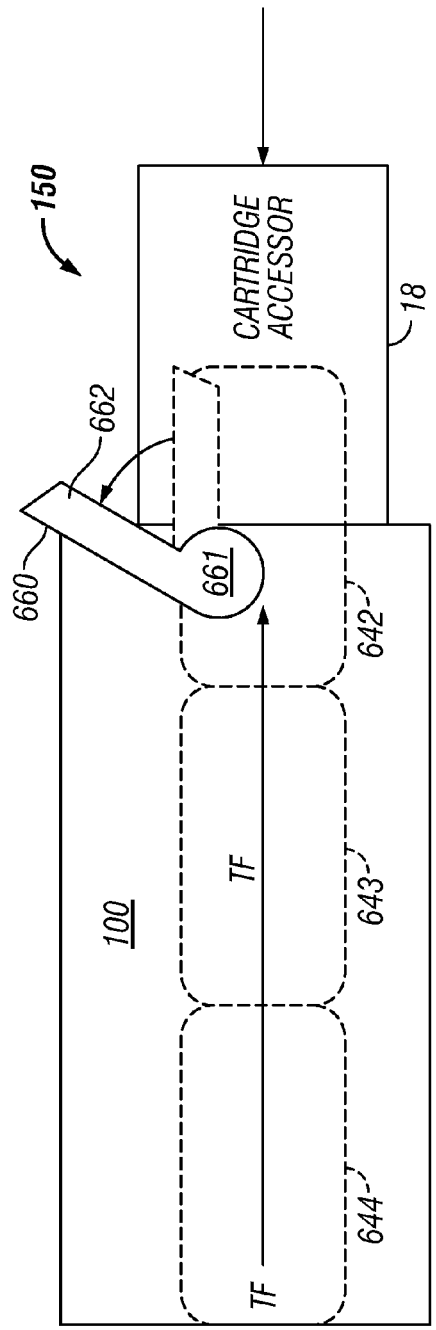

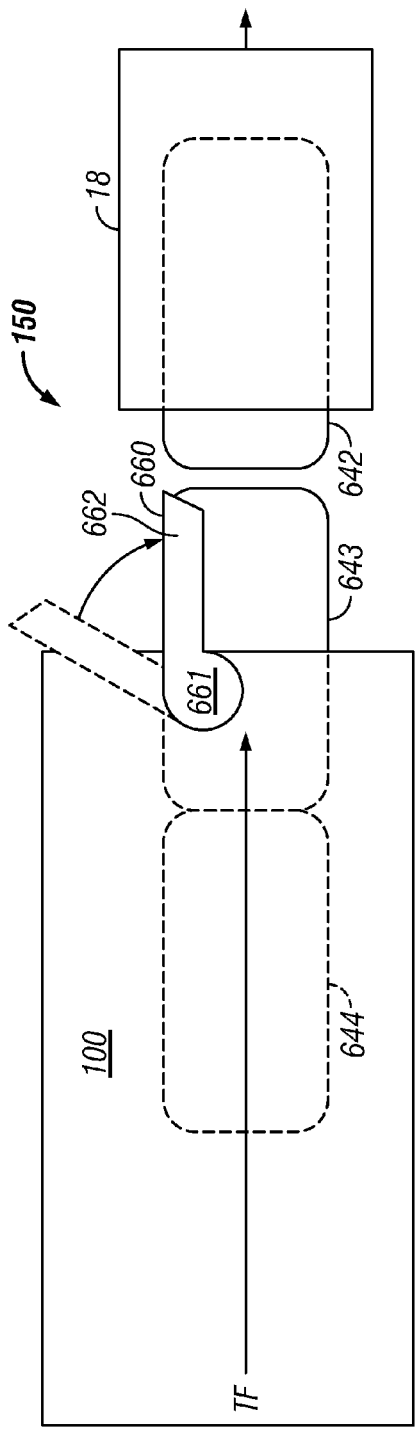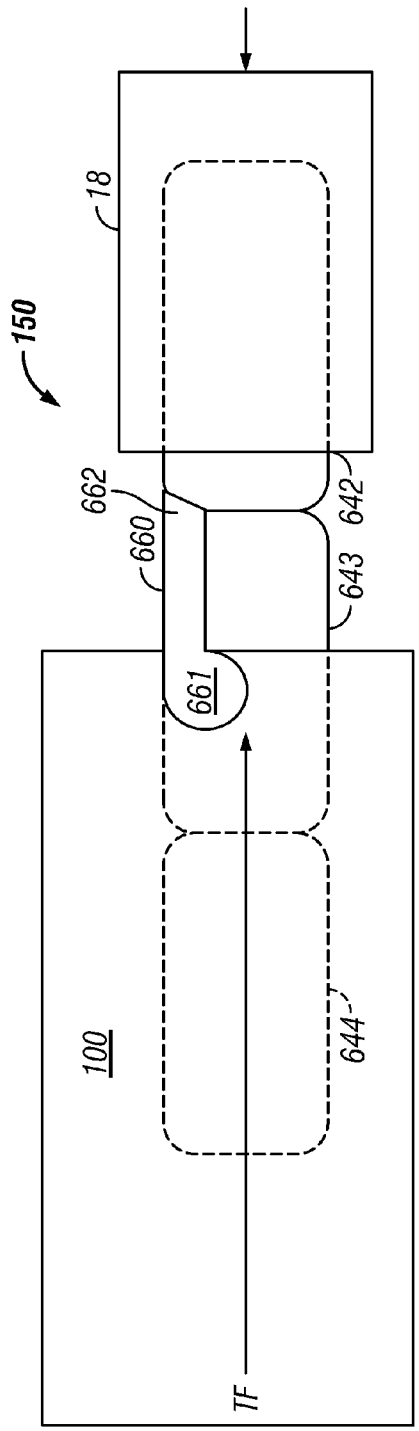

BREADTH SPREADING PLACEMENT OF DATA STORAGE CARTRIDGES IN MULTI-CARTRIDGE DEEP SLOT CELLS OF AN AUTOMATED DATA STORAGE LIBRARY

CROSS REFERENCE TO RELATED APPLICATION

The present Application is a continuation of copending U.S. patent application Ser. No. 12/200,659, filed Aug. 28, 2008.

DOCUMENT INCORPORATED BY REFERENCE

Commonly assigned U.S. patent application Ser. No. 12/200,713 and commonly assigned U.S. patent application Ser. No. 12/200,689, both filed on common date herewith, are incorporated herein by reference in their entirety.

FIELD OF THE INVENTION

The present invention generally relates to automated data storage libraries. More specifically, the invention relates to storage libraries with multi-cartridge deep slot cells.

BACKGROUND OF THE INVENTION

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the X and Y directions.

In an effort to increase storage capacity, deep slot technology allows for storage cells that contain more than a single data storage cartridge. Such storage libraries allow for higher density, or more cartridges stored per square foot. In 'deep slot' libraries, two or more cartridges may be stored in a multi-cartridge deep slot cell, arrayed in series, one behind the other, in tiers ranging from a frontmost tier to a rearmost tier.

Placing a data storage cartridge in a multi-cartridge deep slot cell results in moving any cartridge(s) already in the cell towards the rearmost tier, thereby "demoting" those cartridge(s). When the rearmost tier is filled with a cartridge, the entire deep slot cell is full.

Accessing a desired cartridge not at the frontmost tier thus requires removing cartridges stored in front of the desired cartridge, temporarily depositing the removed cartridge(s) at some available storage, accessing the desired cartridge, and replacing the previously removed cartridge(s). As the result of removal of the accessed cartridge, the cartridges originally behind and remaining in the deep slot cell are "promoted" to positions closer to, or at the frontmost tier.

Accessing data storage cartridges from positions not at the frontmost tier tends to decrease the performance of the automated data storage library in accordance with the number of tiers of the position of the accessed cartridges from the frontmost tier.

SUMMARY OF THE INVENTION

Methods for operating automated data storage libraries are provided.

In one embodiment, a method for operating an automated data storage library having at least a plurality of multi-cartridge deep slot cells, each configured to store up to a plurality of data storage cartridges arranged in sequential order of tiers from front to rear, and having at least one accessor configured to selectively extract, place and transport data storage cartridges with respect to the multi-cartridge deep slot cells, the method comprises the steps of:

operating the accessor(s) to selectively extract, place and transport data storage cartridges with respect to the multi-cartridge deep slot cells and with respect to other elements of the automated data storage library; and filling at least the frontmost tier of vacant at least selected multi-cartridge deep slot cells in the selectively extracting, placing and transporting step, while leaving other tiers vacant.

In a further embodiment, the method additionally comprises determining whether the frontmost tier of at least selected multi-cartridge deep slot cells is full; and in response to the determining step indicating that the frontmost tier of at least selected multi-cartridge deep slot cells is full, in the selectively extracting, placing and transporting step, placing a data storage cartridge into the one of the selected multi-cartridge deep slot cells having the factored greatest number of tiers available to place a data storage cartridge.

In another embodiment, the method additionally comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, in the selectively extracting, placing and transporting step, filling each tier of the multi-cartridge deep slot cartridges having vacant tiers available in turn on a random selection basis until the available tiers of the selected multi-cartridge deep slot cells are full.

In still another embodiment, the method additionally comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, in the selectively extracting, placing and transporting step, placing a data storage cartridge in a selected multi-cartridge deep slot cell having at least one available vacant tier and having the least recently used data storage cartridge in the frontmost tier of the multi-cartridge deep slot cell.

In another embodiment, the method additionally comprises determining whether the frontmost tier of at least selected multi-cartridge deep slot cells is full; and in response to the determining step indicating that the frontmost tier of at least selected multi-cartridge deep slot cells is full, determining whether any multi-cartridge deep slot cells have vacant tiers available to place a data storage cartridge, and, if so, in the selectively extracting, placing and transporting step, placing a data storage cartridge in a selected multi-cartridge deep slot cell having at least one available vacant tier and having the closest proximity to the source of the move of the data storage cartridge being placed.

For a fuller understanding of the present invention, reference should be made to the following detailed description taken in conjunction with the accompanying drawings.

BRIEF DESCRIPTION OF THE DRAWINGS

FIGS. 8A, 8B, 8C, 8D illustrate one embodiment of a cartridge blocking mechanism for the cell of FIGS. 7A, 7B;

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
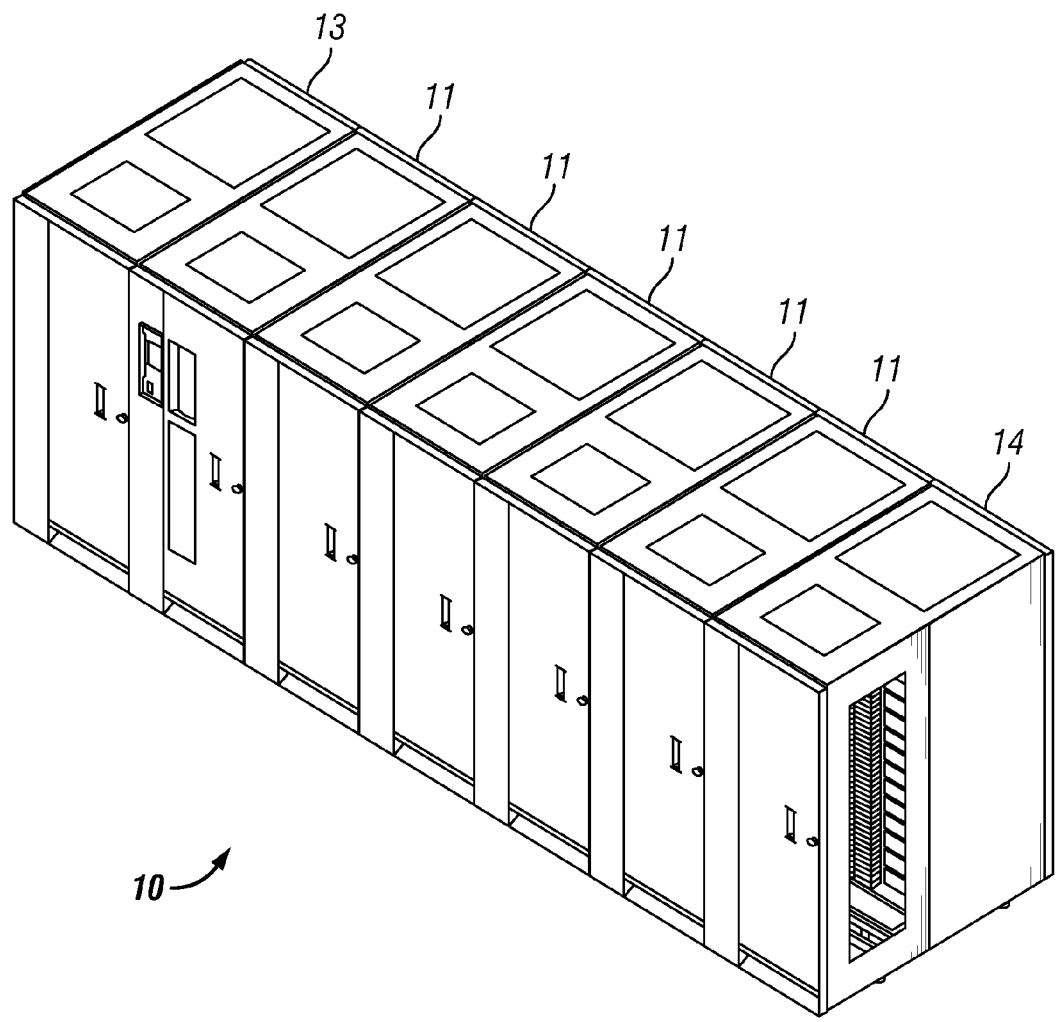
FIG. 1 is an isometric view of an automated data storage library adaptable to implement an embodiment of the present invention, with the view specifically depicting a library having a left hand service bay, multiple storage frames and a right hand service bay.
Figure 2:
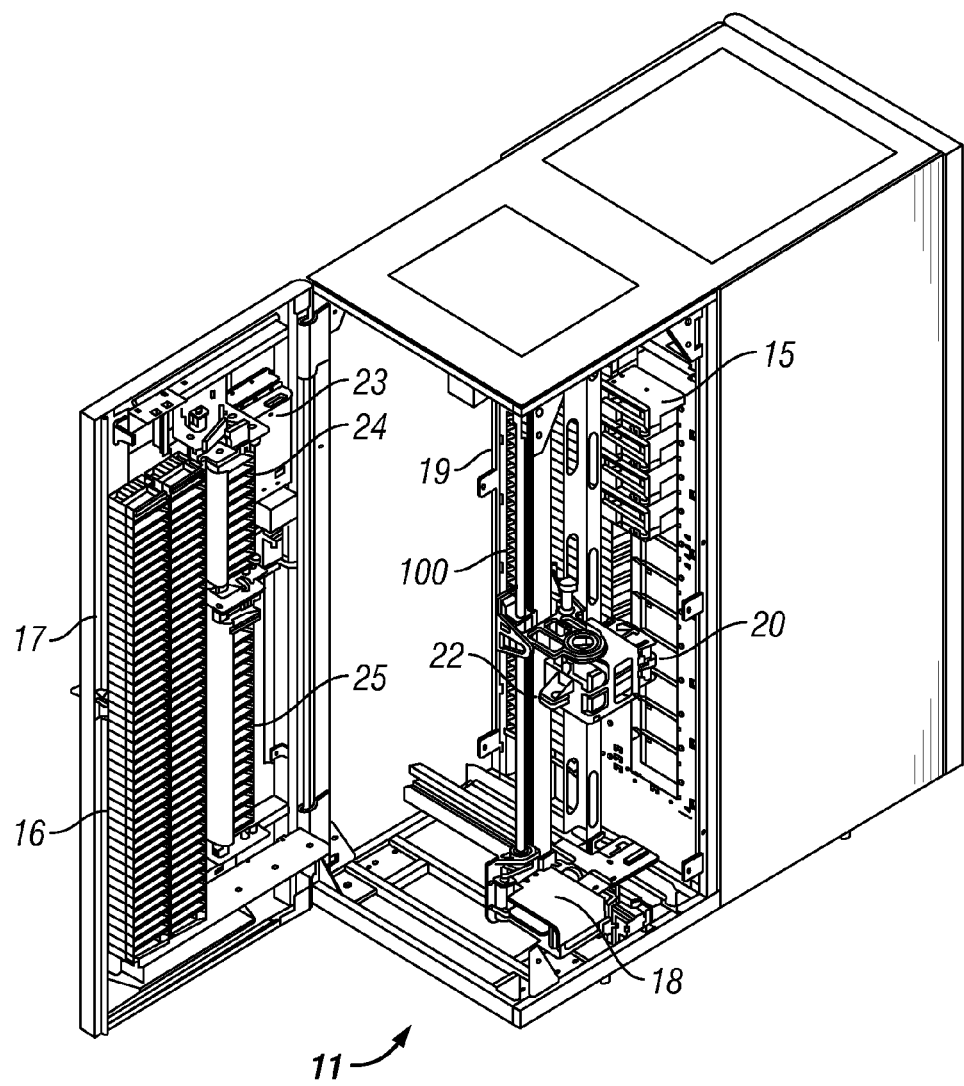
FIG. 2 is an isometric view of an automated data storage library adaptable to implement an embodiment of the present invention, with the view specifically depicting an exemplary basic configuration of the internal components of a library.

FIGS. 1 and 2 illustrate an automated data storage library 10 which stores and retrieves data storage cartridges containing data storage media (not shown) at multi-cartridge deep slot cells 100 and single cartridge storage slots 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage slots, deep slot cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage slots 16 on front wall 17 and a plurality of multi-cartridge deep slot cells 100 on rear wall 19, both for storing data storage cartridges that contain data storage media. The storage slots 16 are configured to store a single data storage cartridge, and the multi-cartridge deep slot cells 100 are configured to store a plurality of data storage cartridges arranged in sequential order of tiers from front to rear. The library also comprises at least one data storage drive 15 for reading and/or writing data with respect to the data storage media; and a first accessor 18 for transporting the data storage media between the plurality of storage slots 16, the multi-cartridge deep slot cells, and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage cartridges to be added to the library inventory and/or removed from the library without disrupting library operation. Herein, adding data storage cartridges to the library may also be called "inserting" data storage cartridges. The library 10 may comprise one or more storage frames 11, each having storage slots 16 accessible by first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges, and another storage frame 11 may comprise storage slots 16 and/ or multi-cartridge deep slot cells 100 and no other components. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
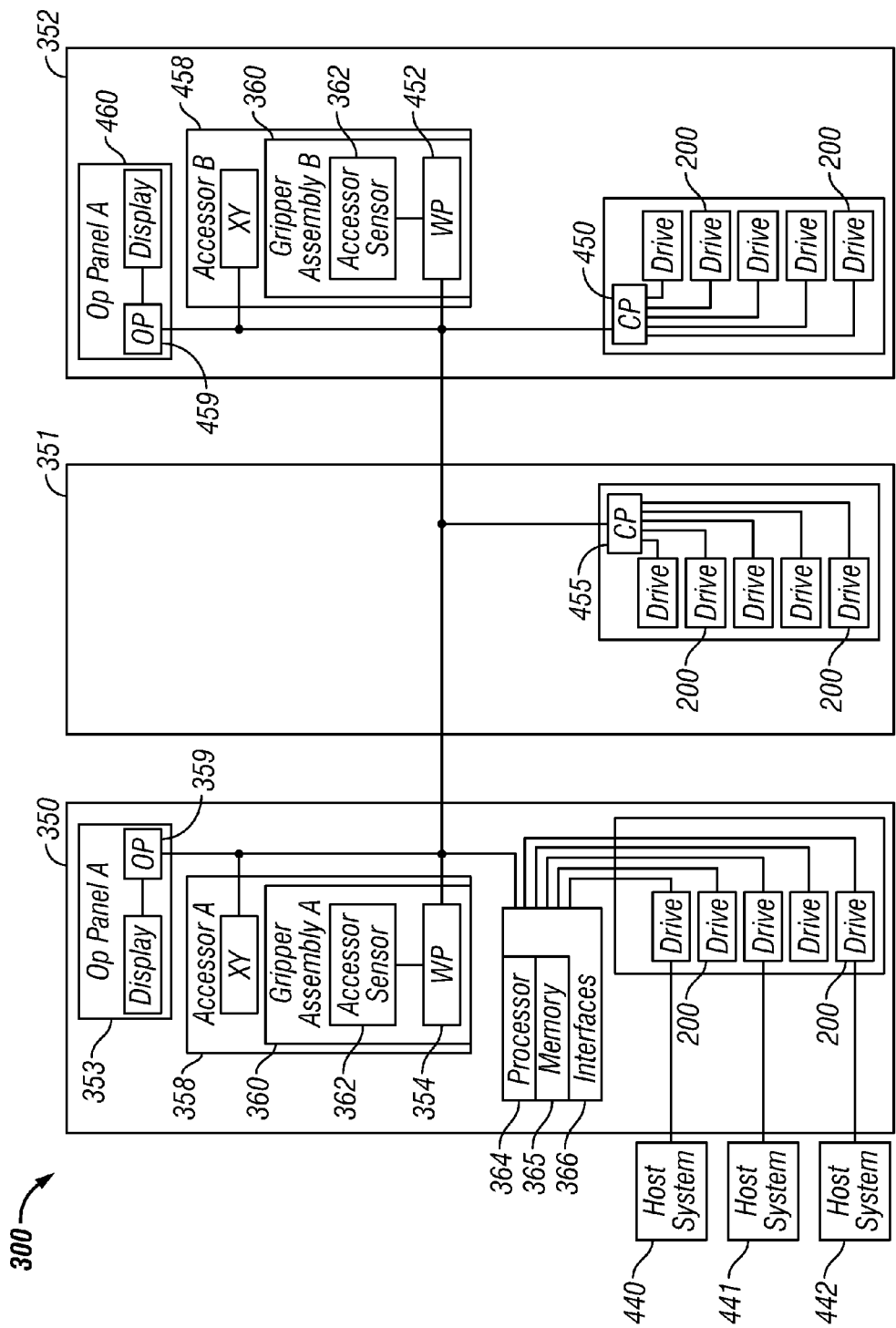
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a controller arranged as a distributed system of modules with a plurality of processor nodes. An example of an automated data storage library which may implement the distributed system depicted in the block diagram of FIG. 3, and which implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage cartridge at the storage slots 16 and multi-cartridge deep slot cells 100, and to load and unload the data storage cartridge at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage cartridges and move the cartridges, for example, between the storage slots 16 and the data storage drives 15. The commands are typically logical commands identifying the cartridges or cartridge media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a library controller, which in one embodiment comprises a distributed control system receiving the logical commands from hosts, determining the required actions, and converting the actions to physical movements of first accessor 18 and/or second accessor 28.

In the exemplary library, the distributed control system comprises a plurality of processor nodes, each having one or more computer processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage slots 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
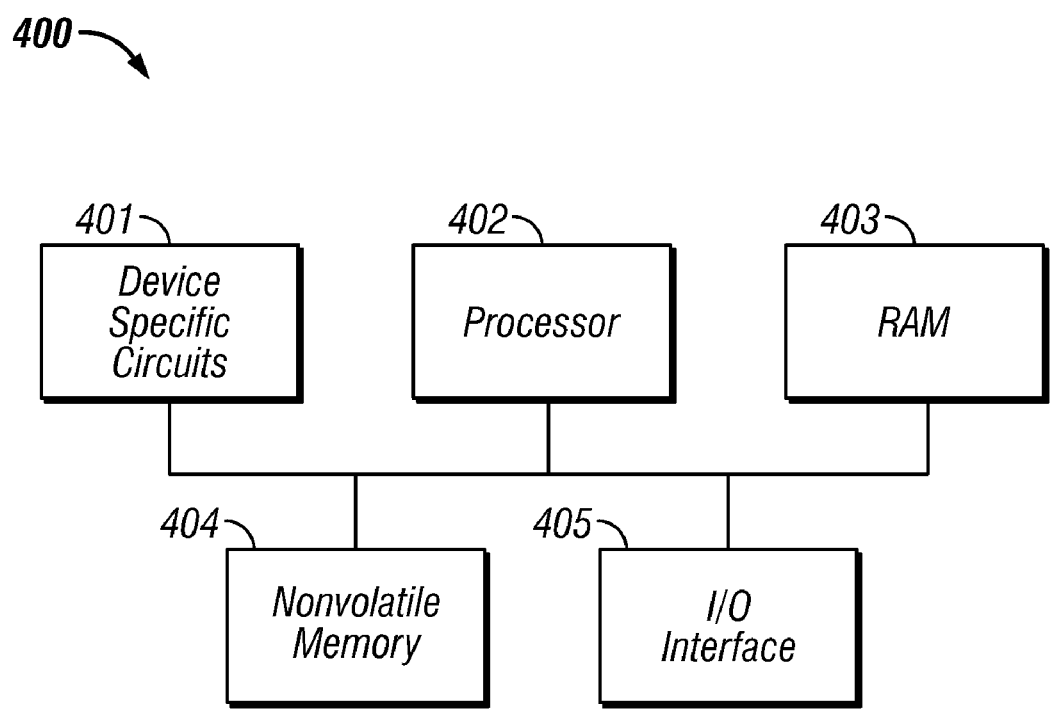
FIG. 4 is a block diagram depicting an exemplary controller configuration.

An automated data storage library 10 typically comprises one or more controllers to direct the operation of the automated data storage library. Host computers and data storage drives typically comprise similar controllers. A library controller may take many different forms and may comprise, for example but not limited to, an embedded system, a distributed control system, a personal computer, or a workstation. Essentially, the term "library controller" as used herein is intended in its broadest sense as a device that contains at least one computer processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus) or SCSI (Small Computer Systems Interface). The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5A:
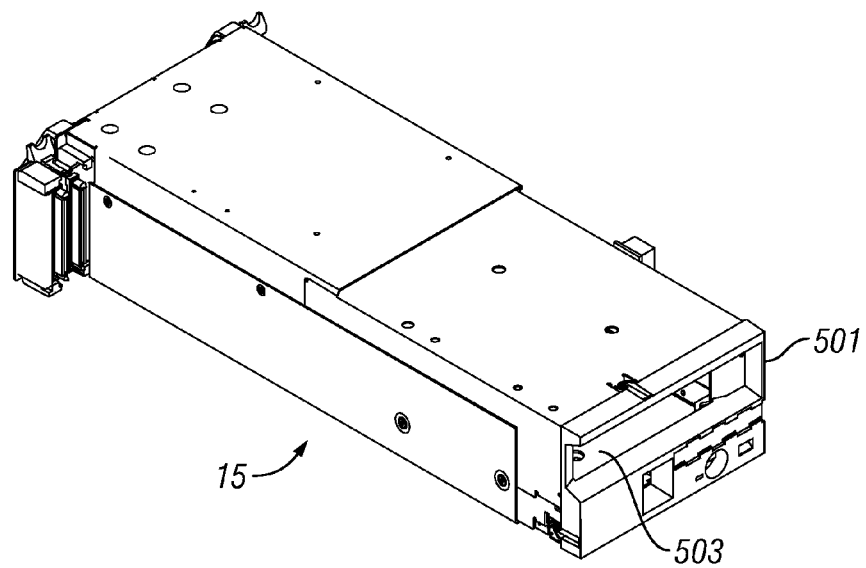
FIG. 5 is an isometric view of the front and rear of a data storage drive of the automated data storage library of FIGS. 1, 2 and 3.
Figure 5B:
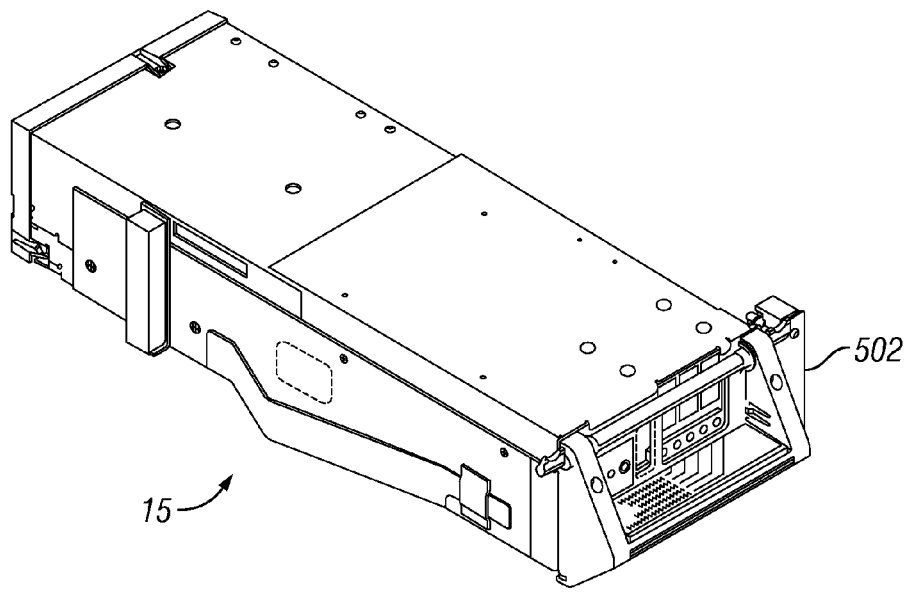

FIGS. 5A and 5B illustrate an embodiment of the front 501 and rear 502 of a data storage drive 15. In the example, the data storage drive 15 comprises a hot-swap drive canister. This is only an example and is not meant to limit the invention to hot-swap drive canisters. In fact, any configuration of data storage drive may be used whether or not it comprises a hot-swap canister. A data storage cartridge may be placed into the data storage drive 15 at opening 503. As discussed above, a data storage drive 15 is used to read and/or write data with respect to the data storage media, and may additionally communicate with a memory which is separate from the media and is located within the cartridge.

Figure 6:
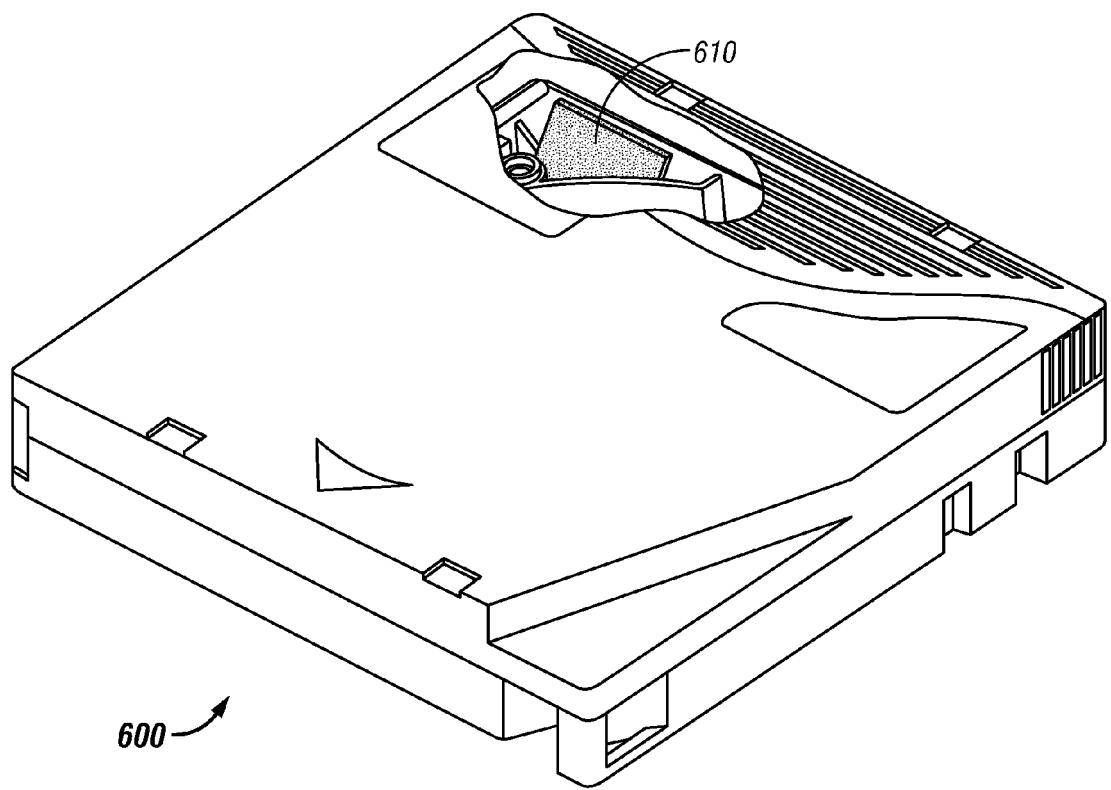
FIG. 6 is an isometric view of a data storage cartridge which may be stored by the automated data storage library of FIGS. 1, 2 and 3.

FIG. 6 illustrates an embodiment of a data storage cartridge 600 with a cartridge memory 610 shown in a cutaway portion of the Figure. This is only an example and is not meant to limit the invention to cartridge memories. In fact, any configuration of data storage cartridge may be used whether or not it comprises a cartridge memory. Media of the data storage cartridge media may comprise any type of media on which data may be stored, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge in which the media is magnetic tape.

Figure 7A:
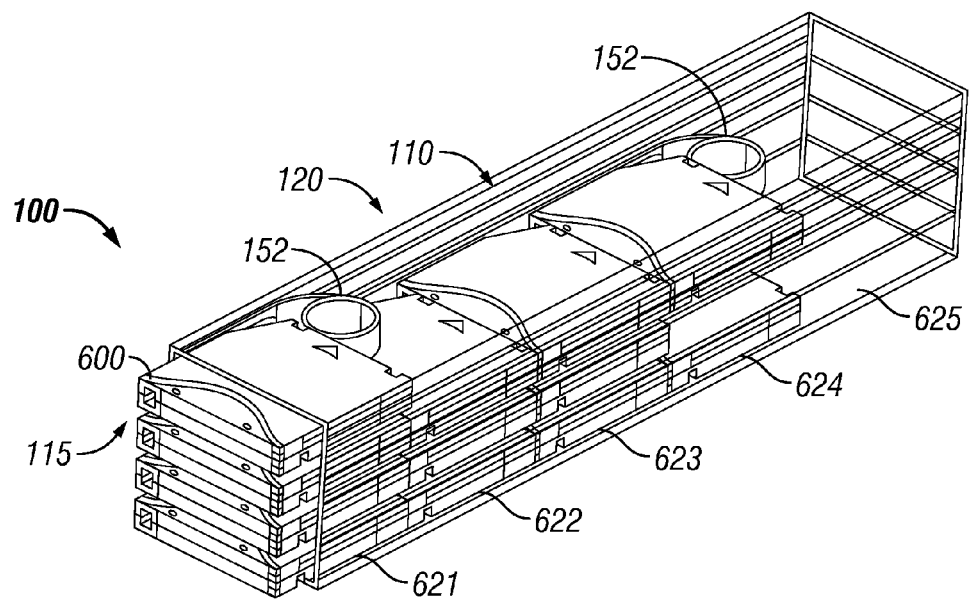
FIGS. 7A, 7B illustrate one embodiment of a multi-cartridge deep slot cell of the automated data storage library of FIGS. 1, 2 and 3.
Figure 7B:
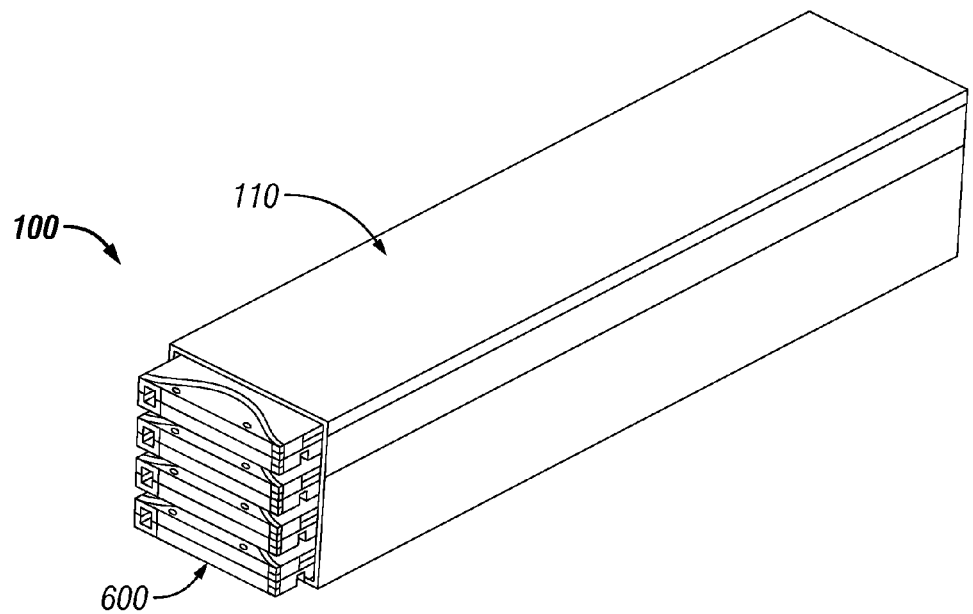

FIGS. 7A and 7B illustrate one embodiment of a multi-cartridge deep slot cell 100 that may be employed in accordance with the present invention, and FIGS. 8A, 8B, 8C and 8D illustrate an embodiment of a retaining gate cartridge blocking mechanism 150 that retains the data storage cartridges in the multi-cartridge deep slot cell 100. Multi-cartridge deep slot cell 100 comprises a housing 110 defining an interior space 115. A plurality of storage slots 120 are disposed within the housing, and are, in one embodiment, configured for storing up to a plurality of data storage cartridges 600.

Alternatively, the multi-cartridge deep slot cell 100 is built into the frame of the automated data storage library.

In one embodiment, the retaining gate is externally attached to a multi-cartridge deep slot cell 100 relative to a front opening of the multi-cartridge deep slot cell 100 whereby the retaining gate can be activated by an accessor of an automated tape library. The retaining gate allows for positive cartridge retention against the pressure of biasing springs 152, and ensures that one or more data storage cartridges do not get pushed out of the multi-cartridge deep slot cell 100 simultaneously while allowing the pushing mechanism of the multi-cartridge deep slot cell 100 to always push the data storage cartridge(s) to the opening in a multi-cartridge deep slot cell 100. The accessor opens the retaining gate to gain access to the data storage cartridge in tier 1 and, upon its extraction, the biasing spring 152 moves the cartridge(s) behind the extracted cartridge forward, promoting the cartridge(s) by one tier.

The basic working of the retaining gate is that the gate prevents the data storage cartridge(s) from being pushed out of a multi-cartridge deep slot cell 100. For example, as shown in FIGS. 8A, 8B, 8C and 8D, a retaining gate 660 can be lifted by, for example, accessor 18 or by a front cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 by the pushing mechanism (not shown) of multi-cartridge deep slot cell 100 causes retaining gate 660 to stay closed in a retaining position as shown in FIG. 8A. Retaining gate 660 is biased such that it closes in the downward direction over the front opening of multi-cartridge deep slot cell 100. This constant biasing can be done by gravity as shown in FIG. 8A or by a spring force attached to retaining gate 660 (not shown).

For removal of front tape cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the pushing mechanism. During extraction of front tape cartridge 642 through the front opening of multi-cartridge deep slot cell 100, retaining gate 660 which is being biased downward moves back to the retaining position to engage storage cartridge 643.

Once front tape cartridge 642 is extracted and storage cartridges 643 and 644 are retained from being pushed out of multi-cartridge deep slot cell 100, retaining gate 660 has successfully completed its cartridge retrieval process. Now retaining gate 660 must demonstrate an ability to work for cartridge insertion into multi-cartridge deep slot cell 100. When accessor 18 begins to insert storage cartridge 642 back into multi-cartridge deep slot cell 100, retaining gate 660 must be lifted to its releasing position in order to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing this operation, storage cartridges 644 and 643 are pushed deeper into multi-cartridge deep slot cell 100 by storage cartridge 642 in multi-cartridge deep slot cell 100 by accessor 18. Upon full insertion into multi-cartridge deep slot cell 100, retaining gate 660 moves to its retaining position to engage storage cartridge 642 as shown in FIG. 8A.

For a fuller understanding of the retaining gate, refer to U.S. patent application Ser. No. 11/674,904, which is entitled "Retaining Gate for Deep Storage Slot Retention of Storage Cartridges", which is incorporated herein for reference.

Access to a storage slot may include the ability to remove a cartridge from a storage slot, the ability to place a cartridge into a storage slot, or combinations thereof.

In this example, the storage slots from top to bottom are considered to be in parallel and comprise the same tier. The storage slots from front to back, in one particular row, are considered to be in series and comprise sequential tiers.

Storage slots 120 are, in one embodiment, configured for storing up to a plurality of data storage cartridges 600, arranged in sequential order of tiers 621, 622, 623, 624 and 625 from front to rear. Herein, the frontmost tier 621 is also called "tier 1", the next tier 622 is called "tier 2", etc., and the last tier 625 is also called the "rearmost" tier.

Referring to FIG. 2, in one embodiment, the single cartridge storage slots 16 are also termed "tier 0".

Referring to FIGS. 1, 2 and 3, in one embodiment, the controller of automated data storage library 10 operates the accessor(s) 18, 28 to selectively extract, place and transport data storage cartridges with respect to the multi-cartridge deep slot cells 100 and with respect to other elements of the automated data storage library, for example, extracting a cartridge from a multi-cartridge deep slot cell 100, transporting the cartridge to a data storage drive 15 and placing the cartridge in the drive. The controller may then extract the cartridge from the data storage drive 15, and the controller will direct the accessor to transport the cartridge to a specific multi-cartridge deep slot cell 100, and place the cartridge in the specific multi-cartridge deep slot cell.

In one embodiment, one or more data storage cartridges may be added (also called inserted) into the library, for example, at an I/O station 24, 25. The controller of automated data storage library 10 operates the accessor(s) 18, 28 to transport the cartridge(s) to specific multi-cartridge deep slot cell(s) 100, and place the cartridge(s) in the specific multi-cartridge deep slot cell(s).

Similarly, the controller may also operate the accessor(s) to selectively extract, place and transport data storage cartridges with respect to the single cartridge storage slots 16, and to transport inserted or added cartridge(s) to specific single cartridge storage slots 16.

Figure 9:
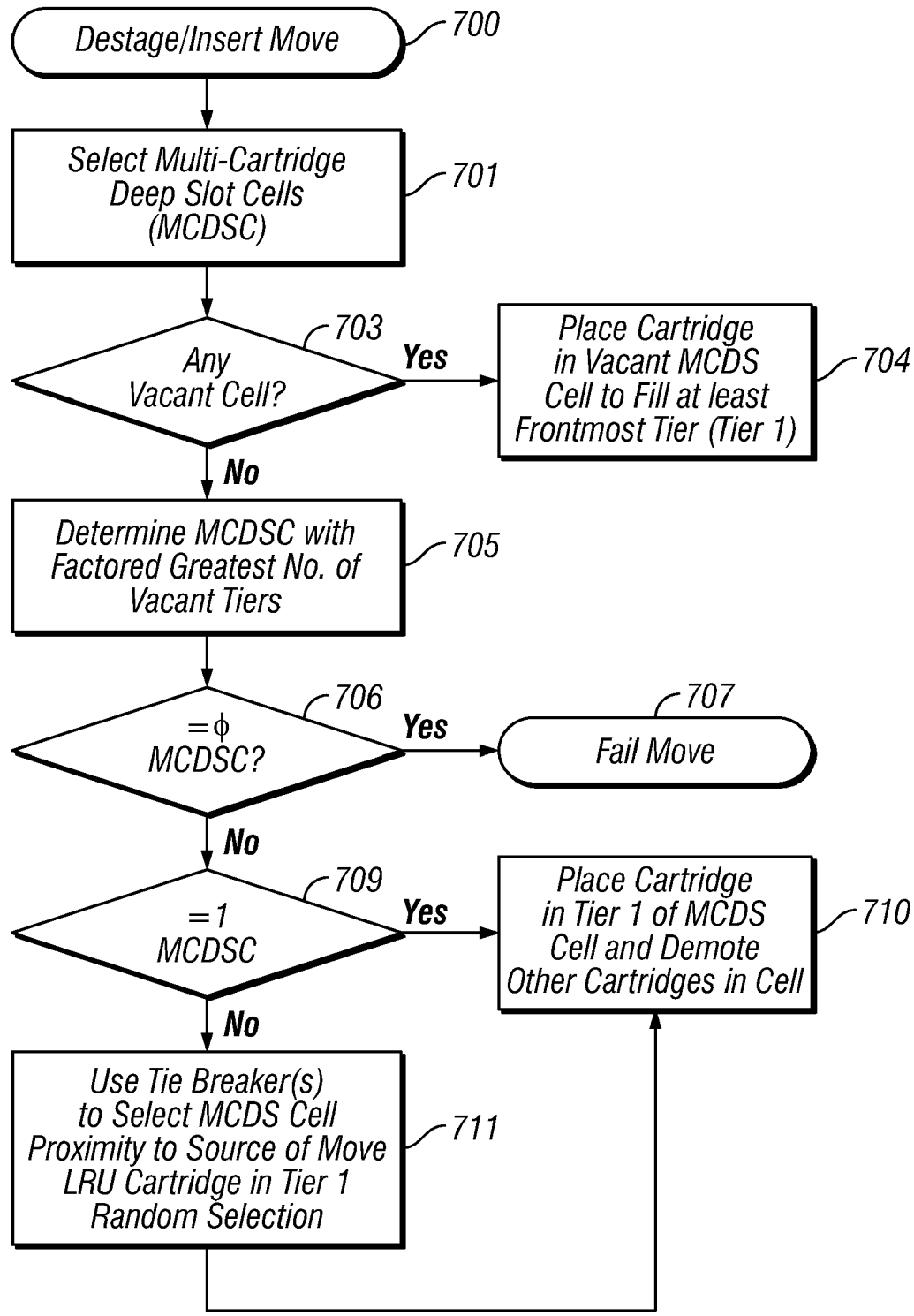
FIG. 9 illustrates one embodiment of a method for storing cartridges in accordance with one aspect of the invention.

Referring to FIGS. 9 and 2, an embodiment of a method of storing data storage cartridges by an automated data storage library in accordance with the present invention comprises method 700 to selectively extract, place and transport data storage cartridges with respect to multi-cartridge deep slot cells, where cartridges are placed in tier 1 (the frontmost tier) of a multi-cartridge deep slot cell, moving or demoting any other cartridges in the multi-cartridge deep slot cell by one tier.

Method 700, deals with insert moves and destage moves. Insert moves comprise adding new cartridges to the library. Destage moves may result from demount moves, demounting cartridges from data storage drive(s) 15. In method 700, for moves from tier 0, the library controller operates the accessor (s) to selectively extract a specific cartridge from one location, and transport the data storage cartridge with respect to other elements of the automated data storage library, for example, to a data storage drive 15.

When the operation(s) at the data storage drive are complete, the controller operates the accessor(s) to return the cartridge to a storage slot 16 or to a multi-cartridge deep slot cell.

If all of the single cartridge storage slots 16 are full, at least in the particular frame of the library of the data storage drive 15 from which the data storage cartridge is demounted, the controller may swap the data storage cartridge with a data storage cartridge in a storage slot. The swapped data storage cartridge is demoted to tier 1 of a multi-cartridge deep slot cell 100, in an action called "destage", and the demounted cartridge is moved to the storage slot vacated by the demoted cartridge. All of the single cartridge storage slots may be full because the cartridges mounted in the data storage drives are all from the multi-cartridge deep slot cells.

In accordance with the present invention, demount moves directly to tier 1 from a data storage drive 15 may occur, for example, because all of the single cartridge storage slots 16 are full and no cartridge is to be demoted to tier 1.

Referring to FIG. 9, step 701 for a destage or insert move comprises selecting the multi-cartridge deep slot cells from which to make the choice of loading. One choice may comprise a single column of multi-cartridge deep slot cells closest to the source of the move to limit the potential lateral movement of the accessor. An expanded choice may be a section of the library encompassing more than one column. Another choice may be a frame of the library. A last choice may be the entire library.

As an example, the library controller maintains an inventory, and, before movement of the accessor, completes the selection of a multi-cartridge deep slot cell to place the added or inserted cartridge.

In one embodiment, one choice for demount moves from a data storage drive 15, destage moves, or insert moves to tier 1 is "breadth spreading", moving the cartridge(s) to fill at least the frontmost tier (tier 1) of vacant multi-cartridge deep slot cells. Thus, the data storage cartridge, if needed again, is easily accessed without having to remove any overlying cartridge(s).

In step 703, the library controller determines whether any of the selected multi-cartridge deep slot cells is vacant. If so, "YES", the destaged or inserted cartridge is placed in the vacant multi-cartridge deep slot cell to fill at least the frontmost tier (tier 1) in step 704 in accordance with a predetermined algorithm discussed hereinafter. If more than one cell is vacant, tie breakers may be employed in step 704 to select one of the cells to place the data storage cartridge. Possible tie breakers are discussed hereinafter.

Another choice is moving the demounted, destaged or inserted cartridge to the multi-cartridge deep slot cell having the factored greatest number of vacant tiers in step 705.

If, in step 706, the library controller determines that there are no multi-cartridge deep slot cells with an available vacant tier, "YES" in step 706, this means that all tiers of all of the selected cells, except for reserved tiers or cells, are full.

All of the multi-cartridge deep slot cells may be "selected", or, alternatively, one or more may be reserved and the remainder "selected". One example comprises reserving a multi-cartridge deep slot cell to temporarily deposit or store data storage cartridges extracted from the front tiers of another multi-cartridge deep slot cell in order to access and extract a cartridge towards the rear of that other multi-cartridge deep slot cell.

If step 706 indicates that there are no available vacant tiers, the move is failed in step 707, and the cartridge may be ejected to an I/O station 24, 25.

Step 709 may indicate that, in step 705 the library controller determined that only one tier of one multi-cartridge deep slot cell has the greatest number of tiers vacant. If so, "YES", the library controller, in step 710, operates the accessor(s) to place the destaged or inserted cartridge in tier 1 of the cell, thereby demoting the other cartridge(s) in the cell by one tier each.

If there is more than one cell with the same, greatest, number of tiers vacant, "NO" in step 709, step 711 uses one or more tie breakers to select a cell for placing the cartridge. One tie breaker is to select the cell that has the closest proximity to the source of the move. An alternative tie breaker is to select the cell that has the LRU (least recently used) cartridge in tier 1, demoting that cartridge to the next tier. Another alternative tie breaker is random selection.

In step 710, the library controller operates the accessor(s) to place the destaged or inserted cartridge in tier 1 of the cell selected in step 711, thereby demoting the other cartridges in the cell by one tier each.

The predetermined algorithm of step 704 may require that all tier 1's must be filled before demoting data storage cartridges to tier 2, etc. Alternatively, it may be advantageous to fill tier 2, etc., of multi-cartridge deep slot cells that are close to a data storage drive before filling tier 1 of vacant multi-cartridge deep slot cells more distant from a data storage drive. Hence, the predetermined algorithm of step 704 fills at least the frontmost tier (tier 1), and may fill additional tiers of certain cells based on additional factors such as the proximity to a data storage drive.

Similarly, steps 705-711 may comprise a sliding scale where the term "greatest number of vacant tiers" is factored by, for example, proximity to a drive. Thus, a multi-cartridge deep slot cell with N−1, etc., vacant tiers that is close to a data storage drive is considered the same as a multi-cartridge deep slot cell with N vacant tiers that is more distant from a data storage drive. Herein, both a direct, non-sliding scale selection requiring the actual "greatest" number of vacant tiers, and a sliding scale selection equating various numbers of vacant tiers are termed "factored greatest number of vacant tiers".

Figure 10:
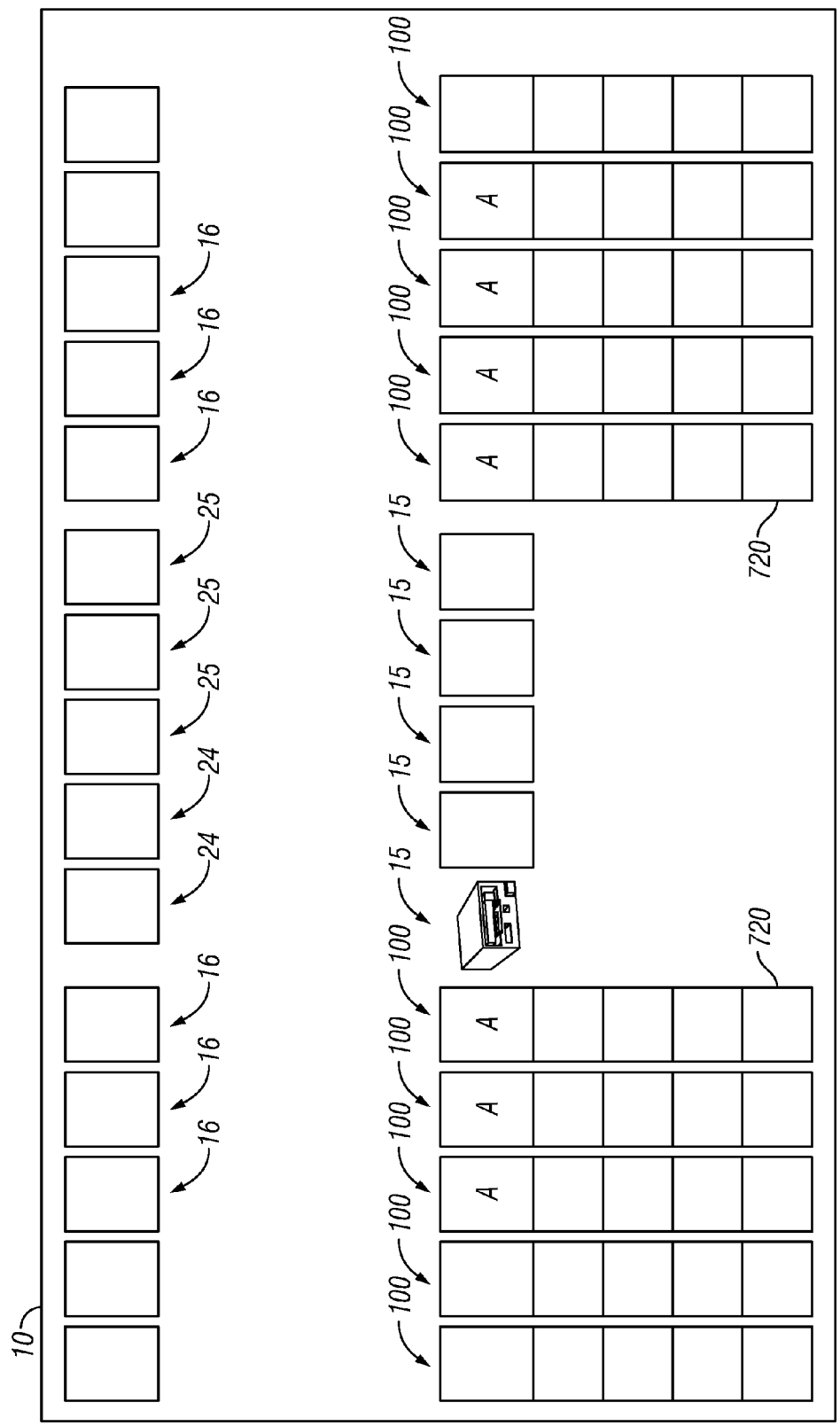
FIGS. 10-11 illustrate examples of operation of the method of FIG. 9 in the automated data storage library of FIGS. 1, 2 and 3.
Figure 11:
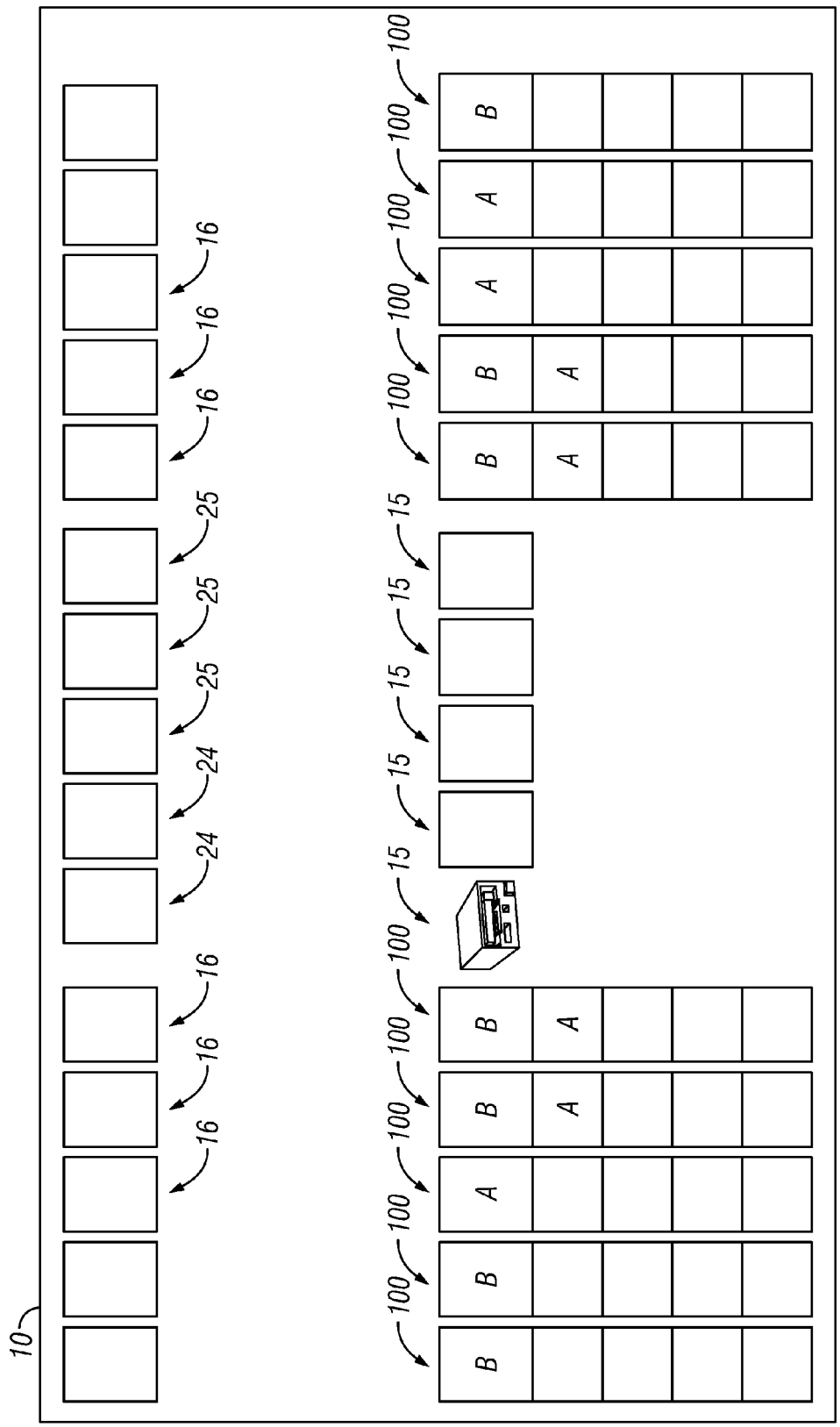

FIGS. 10 and 11 illustrate examples of placing data storage cartridges with respect to selected multi-cartridge deep slot cells. The examples depicted in FIGS. 10 and 11 are two dimensional arrays (or just one layer) used for ease of explanation. The same principals apply for three dimensional arrays of multi-cartridge deep slot cells.

Referring to FIGS. 9 and 10, FIG. 10 illustrates an example of inserting 7 added data storage cartridges in the library 10 in method 700. The data storage cartridges may be received at one or more of the I/O stations 24, 25. In the example, all of the multi-cartridge deep slot cells 100 are initially empty and therefore have a vacant tier 1 available to place a data storage cartridge, and the library controller operates the accessor(s) in accordance with steps 701, 703 and 704 to employ a tie breaker, for example, to place each added data storage cartridge in the frontmost tier of the multi-cartridge deep slot cell having the closest proximity to the source of the move. As each of the cartridges is placed in turn in the multi-cartridge deep slot cells, each cell having a cartridge no longer has a vacant tier 1 available to place a data storage cartridge. Thus, the library controller operates the accessor(s) to place the next cartridge in the multi-cartridge deep slot cell remaining that has a vacant tier 1 available to place a data storage cartridge and uses the tie breaker again.

Referring to FIGS. 9 and 11, continuing the example of FIG. 10, 7 added cartridges are shown inserted in the library 10, for example at one or more of the I/O stations 24, 25. The previously inserted cartridges are designated "A", and the new added cartridges are designated "B". In the example, there are some multi-cartridge deep slot cells 100 remaining initially empty and therefore have a vacant tier 1 available to place a data storage cartridge, and, in step 704, the library controller operates the accessor(s) to employ a tie breaker, for example, to place the added data storage cartridges in the frontmost tier of the multi-cartridge deep slot cell having the closest proximity to the source of the move. Upon the placement of 3 of the cartridges in the frontmost tier of a multi-cartridge deep slot cell, all frontmost tiers become full. As the result, the library controller, in steps 705 and 709, determines that all of the selected multi-cartridge deep slot cells have the greatest number of tiers available to place a data storage cartridge, and the library controller operates the accessor(s) to employ a tie breaker of step 711 to place, in step 710, the added data storage cartridges in the frontmost tier of, for example, the multi-cartridge deep slot cell having the closest proximity to the source of the move, demoting the cartridge already in the frontmost tier (tier 1) to the next tier (tier 2). Each of the added cartridges are placed in turn in the multi-cartridge deep slot cells, and each cell having two cartridges no longer is a cell having the greatest number of tiers available to place a data storage cartridge. Thus, the library controller operates the accessor(s) to place the next cartridge in a remaining multi-cartridge deep slot cell that has the greatest number of tiers available to place a data storage cartridge and uses the tie breaker again.

The library controller may access data storage cartridges that are not stored at tier 0 single cartridge storage slots 16 or at tier 1 of the multi-cartridge deep slot cells 100, such that at least one other data storage cartridge overlies the target cartridge.

The "breadth spreading" discussed above provides an evenly spread availability of the rearmost tier(s) of a number of multi-cartridge deep slot cells. This, in one embodiment, provides vacant tiers in which to temporarily store or deposit overlying data storage cartridges to gain access to a target data storage cartridge.

The invention can take the form of an entirely hardware embodiment, an entirely software embodiment or an embodiment containing both hardware and software elements. In a preferred embodiment, the invention is implemented in software, which includes but is not limited to resident software, microcode, firmware, etc.

Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

Those of skill in the art will understand that changes may be made with respect to the methods discussed above, including changes to the ordering of the choices of the methods of FIG. 9. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for operating an automated data storage library, said automated data storage library comprising at least a plurality of multi-cartridge deep slot cells, each configured to store up to a plurality of data storage cartridges arranged in sequential order of tiers from front to rear, and comprising at least one accessor configured to selectively extract, place and transport data storage cartridges with respect to said multi-cartridge deep slot cells, said method comprising the steps of:

operating said at least one accessor to selectively extract, place and transport data storage cartridges with respect to said multi-cartridge deep slot cells and with respect to other elements of said automated data storage library; and filling at least the frontmost tier of vacant said multi-cartridge deep slot cells in said selectively extracting, placing and transporting step in accordance with a predetermined algorithm, while leaving other tiers vacant.

2. The method of claim 1, comprising the additional steps of:

determining whether said frontmost tier of said multi-cartridge deep slot cells is full; and in response to said determining step indicating that said frontmost tier of at least selected said multi-cartridge deep slot cells is full, in said selectively extracting, placing and transporting step, placing a data storage cartridge into the one of said selected multi-cartridge deep slot cells having the factored greatest number of said tiers available to place a data storage cartridge.

3. The method of claim 1, comprising the additional steps of:

determining whether said frontmost tier of said multi-cartridge deep slot cells is full; and in response to said determining step indicating that said frontmost tier of said multi-cartridge deep slot cells is full, determining whether any said multi-cartridge deep slot cells have vacant tiers available to place a data storage cartridge, and, if so, in said selectively extracting, placing and transporting step, filling each tier of said multi-cartridge deep slot cartridges having said vacant tiers available in turn on a random selection basis until said available tiers of said selected multi-cartridge deep slot cells are full.

4. The method of claim 1, comprising the additional steps of:

determining whether said frontmost tier of said multi-cartridge deep slot cells is full; and in response to said determining step indicating that said frontmost tier of said multi-cartridge deep slot cells is full, determining whether any said multi-cartridge deep slot cells have vacant tiers available to place a data storage cartridge, and, if so, in said selectively extracting, placing and transporting step, placing a data storage cartridge in a multi-cartridge deep slot cell having at least one available vacant tier and having the least recently used data storage cartridge in said frontmost tier of said multi-cartridge deep slot cell.

5. The method of claim 1, comprising the additional steps of:

determining whether said frontmost tier of said multi-cartridge deep slot cells is full; and in response to said determining step indicating that said frontmost tier of said multi-cartridge deep slot cells is full, determining whether any said multi-cartridge deep slot cells have vacant tiers available to place a data storage cartridge, and, if so, in said selectively extracting, placing and transporting step, placing a data storage cartridge in a multi-cartridge deep slot cell having at least one available vacant tier and having the closest proximity to the source of the move of said data storage cartridge being placed.

6. A method for operating an automated data storage library, said automated data storage library comprising at least a plurality of multi-cartridge deep slot cells, each configured to store up to a plurality of data storage cartridges arranged in sequential order of tiers from front to rear, and comprising at least one accessor configured to selectively extract, place and transport data storage cartridges with respect to said multi-cartridge deep slot cells, said method comprising the steps of:

selecting a set of said multi-cartridge deep slot cells;

operating said at least one accessor to selectively extract, place and transport data storage cartridges with respect to said multi-cartridge deep slot cells and with respect to other elements of said automated data storage library; and filling at least the frontmost tier of vacant said selected multi-cartridge deep slot cells in said selectively extracting, placing and transporting step in accordance with a predetermined algorithm, while leaving other tiers vacant.

7. The method of claim 6, comprising the additional steps of:

determining whether said frontmost tier of said selected multi-cartridge deep slot cells is full; and in response to said determining step indicating that said frontmost tier of said selected multi-cartridge deep slot cells is full, in said selectively extracting, placing and transporting step, placing a data storage cartridge into the one of said selected multi-cartridge deep slot cells having the factored greatest number of said tiers available to place a data storage cartridge.

8. The method of claim 6, comprising the additional steps of:

determining whether said frontmost tier of said selected multi-cartridge deep slot cells is full; and in response to said determining step indicating that said frontmost tier of at least selected said multi-cartridge deep slot cells is full, determining whether any said selected multi-cartridge deep slot cells have vacant tiers available to place a data storage cartridge, and, if so, in said selectively extracting, placing and transporting step, filling each tier of said selected multi-cartridge deep slot cartridges having said vacant tiers available in turn on a random selection basis until said available tiers of said selected multi-cartridge deep slot cells are full.

9. The method of claim 6, comprising the additional steps of:

determining whether said frontmost tier of said selected multi-cartridge deep slot cells is full; and in response to said determining step indicating that said frontmost tier of said selected multi-cartridge deep slot cells is full, determining whether any said multi-cartridge deep slot cells have vacant tiers available to place a data storage cartridge, and, if so, in said selectively extracting, placing and transporting step, placing a data storage cartridge in a selected multi-cartridge deep slot cell having at least one available vacant tier and having the least recently used data storage cartridge in said frontmost tier of said multi-cartridge deep slot cell.

10. The method of claim 6, comprising the additional steps of:

determining whether said frontmost tier of said selected multi-cartridge deep slot cells is full; and in response to said determining step indicating that said frontmost tier of said selected multi-cartridge deep slot cells is full, determining whether any said multi-cartridge deep slot cells have vacant tiers available to place a data storage cartridge, and, if so, in said selectively extracting, placing and transporting step, placing a data storage cartridge in a selected multi-cartridge deep slot cell having at least one available vacant tier and having the closest proximity to the source of the move of said data storage cartridge being placed.

\* \* \* \* \*